United States Patent
Van Der Poel et al.

(10) Patent No.: US 8,814,374 B2
(45) Date of Patent: Aug. 26, 2014

(54) SYSTEM FOR COMBINING EXTERIOR LIGHTING AND ARTIFICIAL LIGHTING

(75) Inventors: Lucas Leo Desiree Van Der Poel, Waalre (NL); Dorien Cato Van Der Lans, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 170 days.

(21) Appl. No.: 13/581,523

(22) PCT Filed: Feb. 25, 2011

(86) PCT No.: PCT/IB2011/050811
§ 371 (c)(1), (2), (4) Date: Aug. 28, 2012

(87) PCT Pub. No.: WO2011/107918
PCT Pub. Date: Sep. 9, 2011

(65) Prior Publication Data
US 2012/0320560 A1 Dec. 20, 2012

(30) Foreign Application Priority Data
Mar. 2, 2010 (EP) .................................. 10155113

(51) Int. Cl.
*F21S 19/00* (2006.01)
*F21V 23/04* (2006.01)
*E06B 9/24* (2006.01)

(52) U.S. Cl.
CPC ..... *F21V 23/0442* (2013.01); *E06B 2009/2476* (2013.01); *E06B 2009/2417* (2013.01)
USPC .................................. 362/1; 362/2; 362/276

(58) Field of Classification Search
CPC ................ E06B 2009/2417; E06B 2009/2476; F21S 19/005; F21V 23/0442; Y02B 80/50
USPC .......................................... 362/1, 2, 147, 276
See application file for complete search history.

(56) References Cited

U.S. PATENT DOCUMENTS

| 4,273,999 A | | 6/1981 | Pierpoint | |
|---|---|---|---|---|
| 5,528,471 A | * | 6/1996 | Green | 362/147 |
| 5,598,000 A | * | 1/1997 | Popat | 250/206 |

(Continued)

FOREIGN PATENT DOCUMENTS

| DE | 102005010702 A1 | 9/2006 |
|---|---|---|
| DE | 102005032657 A1 | 2/2007 |

(Continued)

*Primary Examiner* — Stephen F Husar
*Assistant Examiner* — James Cranson, Jr.
(74) *Attorney, Agent, or Firm* — Yuliya Mathis

(57) ABSTRACT

A system for combining exterior light with artificial lighting, comprising a light shielding arrangement (2) for shielding exterior light from a space (5) and at least one light source (6) arranged to emit artificial light that is directed toward the exterior side of the light shielding arrangement (2), which light source (6) is controllable in response to current exterior lighting conditions. The system further comprises a controller (8) connected to said light source (6), which is arranged to control light emission of the light source (6) in response to a current position of the light shielding arrangement, so as to emulate an effect of exterior light escaping through the light shielding arrangement. The artificial light can thus be controlled (manually or automatically) to compensate for lack of sufficient exterior light, and the controller ensures that the artificial light is emitted in such a way as to be perceived as exterior light.

13 Claims, 7 Drawing Sheets

(56) References Cited

U.S. PATENT DOCUMENTS

| | | | |
|---|---|---|---|
| 6,084,231 A * | 7/2000 | Popat | 250/214 AL |
| 7,057,821 B2 | 6/2006 | Zincone | |
| 7,566,137 B2 * | 7/2009 | Veskovic | 362/1 |
| 8,456,729 B2 * | 6/2013 | Brown et al. | 359/275 |
| 2007/0221338 A1 | 9/2007 | Meewis et al. | |
| 2008/0180553 A1 | 7/2008 | Hassan-Shafique et al. | |
| 2008/0271856 A1 * | 11/2008 | Paulussen et al. | 160/127 |

FOREIGN PATENT DOCUMENTS

| | | |
|---|---|---|
| DE | 102008002219 A1 | 12/2009 |
| WO | 2006123283 A2 | 11/2006 |
| WO | 2009156885 A1 | 12/2009 |

\* cited by examiner

SYSTEM FOR COMBINING EXTERIOR LIGHTING AND ARTIFICIAL LIGHTING

TECHNICAL FIELD

The present invention relates to a system for combining light from exterior lighting (such as daylight) and light from artificial lighting.

BACKGROUND OF THE INVENTION

Various light shielding arrangements are known in the art, and typically serve to limit the amount of exterior light that is allowed to enter a room or space.

One example of a light shielding arrangement that may be favorable is manually or automatically controlled Venetian blinds. The angle of the plurality of slats, that may be vertically or horizontally arranged in for example a window, may be controlled to allow a convenient level of daylight to enter a space. Overheating of the space can thereby be avoided, and costs for cooling the space is thereby reduced. Moreover, the angle of the slats may be controlled so as to avoid inconvenient glare of light. However, when there is not sufficient or no daylight, depending on for example weather conditions or time of the day, the light entering the space through the blinds is generally compensated by switching on more light indoors. It has however been found that people conventionally prefers to stay in a space having light entrance through windows, and that patients in a hospital even recover faster when light enters their windows.

Recently, daylight deflection systems have been used for indoor lighting to improve the indoor lighting in situations without sufficient daylight and/or for decorative effect. WO 2006/123283 teaches a device wherein an illumination device illuminates slats of a daylight shielding device for the slats to direct the light into the space, to achieve a desired illumination of the space. The illumination is varied in dependence of position and orientation of the slats and/or the features of the surface of the slats.

Although providing a useful indoor illumination system using a daylight deflection system in WO 2006/123283, there is a need for an improved system that can provide a more natural lighting by means of artificial lighting.

SUMMARY OF THE INVENTION

The above is met by a system for combining light from exterior lighting with light from artificial lighting, comprising a light shielding arrangement for shielding exterior light from a space, the light shielding arrangement having an interior side toward the inside of the space, and an exterior side toward the outside of the space, and at least one light source arranged to emit artificial light that is directed toward the exterior side of the light shielding arrangement, the light source being controllable in response to current exterior lighting conditions. The system further comprises a controller connected to the light source, and arranged to control light emission of the light source in response to a current position of the light shielding arrangement, so as to emulate an effect of exterior light escaping through the light shielding arrangement.

The artificial light can thus be controlled (manually or automatically) to compensate for lack of sufficient exterior light, and the controller ensures that the artificial light is emitted in such a way as to be perceived as exterior light. In a typical case the artificial light source has a very low light output power compared to the light output power of the exterior light (e.g. outside daylight, or the total illumination of a neighboring area). By automatically controlling the light source in response to the position of the light shielding arrangement, this limited light can be used effectively to emulate exterior light passing through the shielding arrangement.

By "space" is here intended any space which may be shielded from exterior light by means of a light shielding arrangement. The light shielding arrangement may hence be arranged in any transparent opening between the outside of the space and the inside of the space wherein exterior light may enter. The most common examples are conventional windows and windows arranged in doors, conventionally facing a room of a building. However, other openings, such as openings without any window glass are also feasible, which for example may be arranged in relation to balconies, or terraces. Moreover, the space may be a space that is adjacent to another indoor space, whereby the opening divides the two indoor spaces. In this case, the exterior lighting may also be artificial. An example may be an office that is adjacent to a corridor, between which a window or other opening with a light shielding arrangement is arranged.

In a typical example, the exterior light is natural daylight, and the light shielding arrangement is a sunscreen, such as a curtain or a venetian blind comprising a plurality of horizontal slats. The light source may accordingly be controlled in response to the current daylight lighting conditions that depend on for example the time of the day, weather conditions and seasonal variations.

Further, the at least one light source may be arranged outside the light shielding arrangement. Alternatively, the light source may be arranged elsewhere, such as on the inside of the light shielding arrangement, and the system may then comprise a light redirecting element for directing the light toward the exterior side of the window. The light redirecting element may comprise one or several reflectors, light guides, lenses, prisms, or other optical means. The light source may hence be located anywhere where the light may be directed toward the light shielding arrangement, such as in the window frame, on a distance from the light shielding arrangement, on a high level or on a low level in relation to the opening. Different locations affect the emitted light differently. For example, more or less of the light is reflected by the light shielding arrangement, and the direction of light entering the space differs depending on the location of the at least one light source.

Preferably, the at least one light source may be adapted to emit directional light which is advantageous as it enables improved control of the emitted light to thereby obtain the same character as exterior light, in contrast to diffuse light sources.

Even more preferably, the at least one light source may be a solid state light source, which may be controlled in numerous ways, such as color controlled. For example, the solid state light source may be a light emitting diode (LED).

The system may further comprise a detector for detecting a current position of the light shielding arrangement, the detector being connected to the controller and adapted to provide the controller with information regarding the current position of the light shielding arrangement. Such a detector may be designed in various ways depending on the type of light shielding arrangement, and enables an automatic system.

Moreover, the system may further comprise a light sensor, for detecting the current exterior lighting conditions; the light sensor being connected to the controller and adapted to provide the controller with information regarding the exterior lighting conditions. The current exterior lighting conditions may thus be automatically detected as well as the light source automatically controlled to compensate for current exterior lighting conditions, such as grey weather, or a low level of sunlight, such as in the morning or in the evening. The transition from exterior lighting to artificial lighting or vice versa may hence occur without a person located in the space even noticing.

The light sensor may be configured to detect at least one of a luminance level and a color temperature. By detecting a luminance level, a low luminance level of exterior light may be compensated for by switching the light source on and to emit light with a compensating luminance level. The luminance level may thereby be kept constant although the source of light alters. By luminance is here intended luminous intensity per unit area of light travelling in a given direction. By detecting a color temperature, a desired color temperature may be obtained by suitable control. For example, a detected color temperature of cold white may be compensated by a warmer white color temperature from the artificial lighting. Alternatively, saturation factors may be added to the emitted light to achieve other colors than white, which for example may be used to stage sunset or sunrise impression in the space. Accordingly, it may be possible to create all shades of daylight effects, from warm red to more bluish scenes.

Moreover, the controller may be configured to control a position and orientation of the plurality of slats in response to the combined daylight and artificial lighting or the current exterior lighting conditions. By that means, for example the angle of the slats may be controlled to avoid glare in the space when the entering light is too bright, the light may be directed toward the ceiling or the floor, or the gap between the slats may be made bigger when the light is relatively soft.

Alternatively, the controller may be configured to control a position and orientation of the plurality of slats in response the light source output, which is the only light source when it is dark outside.

According to one embodiment, the light shielding arrangement comprises a plurality of controllable slats, which are positionable to allow exterior light to enter between the slats. An example of such an arrangement is a Venetian blind.

In this case, the system may comprise at least one solar cell arranged on one of the slats. Alternatively, or additionally, the system may comprise a solar cell arranged at a distance from the slats, the solar cell being arranged in a position allowing daylight to be reflected by said slats toward the solar cell. By arranging solar cells to convert the energy from sunlight to electricity for charging the system less or no additional electricity is needed to drive the components of the system, such as the automatic function of the slats and the light source. By using solar energy, the electricity costs decrease, at the same time as it is advantageous for the environment.

Furthermore, the system may further comprise a presence detector, arranged on the inside of the space, the controller being configured to control the slats to perform sun tracking as long as no presence is detected. By using presence detection the system may be used completely for sun tracking when there is no one in the space, even if it requires that the slats are closed. The solar cells may however still be functional when the slats are optimized for letting daylight, possibly in combination with artificial light, into the space, although less sunlight will be directed toward the solar cell or cells compared when the system is intended exclusively for sun tracking By sun tracking means that the slats are oriented toward the sun for optimal collection of solar energy. However, the slats may be adapted to always obtain the same orientation when the system is intended for collection of solar energy. For example, the slats may be closed when merely collecting solar energy, if the solar cells are arranged on the slats.

BRIEF DESCRIPTION OF THE DRAWINGS

The invention, including its particular features and advantages, will be readily understood from the following detailed description and the accompanying drawings, in which.

DETAILED DESCRIPTION

Figure 1:
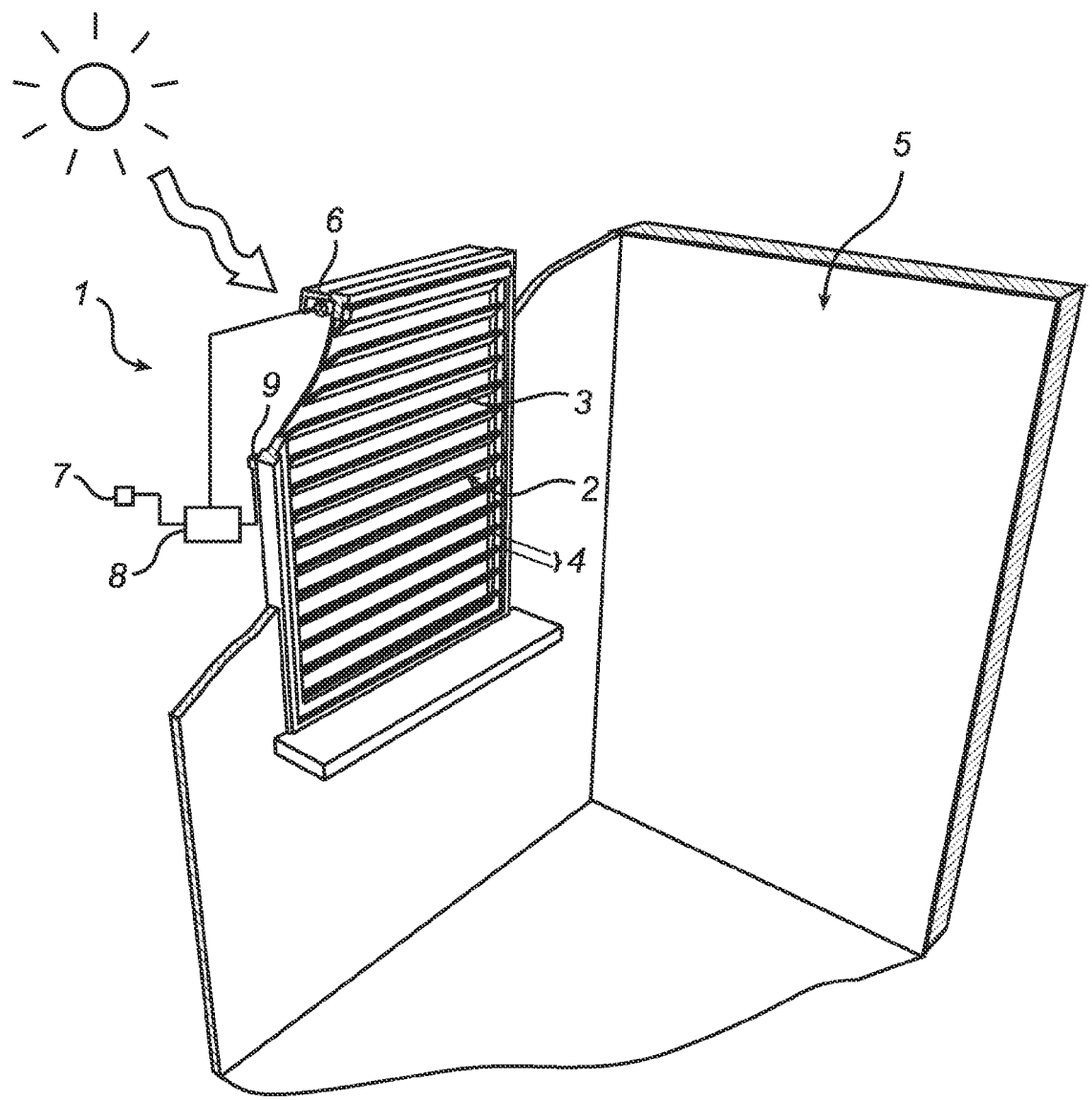
FIG. 1 schematically shows a system according to an embodiment of the present invention mounted in a window with a light shielding arrangement comprising horizontal slats.

FIG. 1 shows a window 1 of a room 5 provided with a system according to an embodiment of the present invention. The system comprises a light shielding arrangement 2, covering the full length of the window 1 and here arranged on the inside of the window 1 toward the interior of the room 5. Obviously, the light shielding arrangement may be arranged on any side of the window pane, toward the inside of the room or toward the outside of the room in relation to the window. Or, the light shielding arrangement may be arranged between transparent panes of the window.

Figure 4:
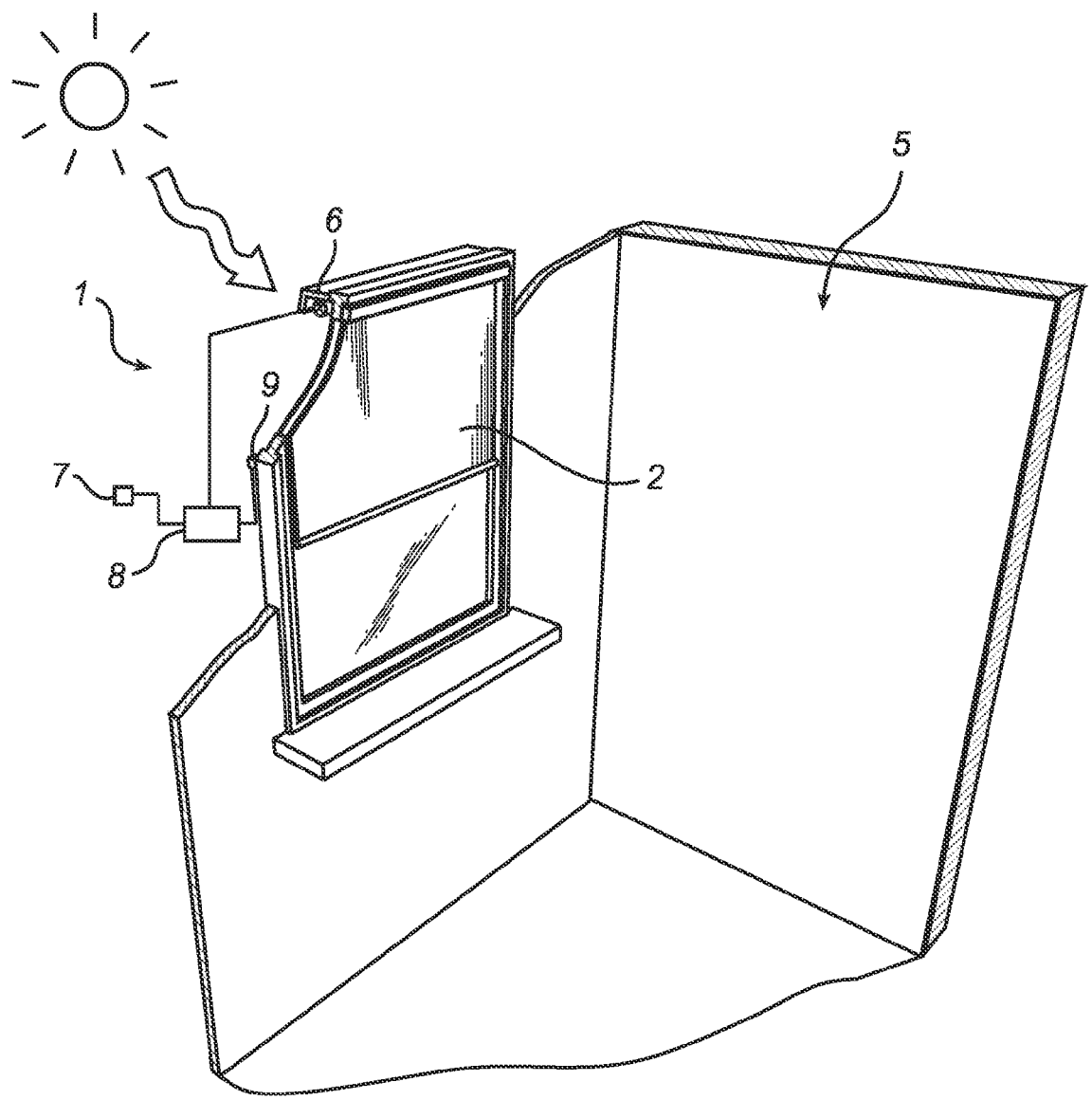
FIG. 4 schematically shows a system according to an embodiment of the present invention mounted in a window with a light shielding arrangement formed by a curtain.

In the present example, the light shielding arrangement 2 is of venetian blind type, and comprises a plurality of horizontally arranged slats 3 that are illustrated in an opened position wherein equally sized horizontal gaps 4 are present between each of the slats 3. The slats 3 are hence arranged to let sunlight shine from the outside through the slats into the room 5. The light shielding arrangement 2 can also be a curtain, as illustrated in FIG. 4.

A light source 6 is moreover arranged outside the window 1. The light source may be any light source such as a solid state light source, a light bulb or a fluorescent light source. Here, the light source 6 is centrally arranged in the window frame above the window 1. The light source 6, or another light source, may be arranged in the bottom of the window. Such arrangement of a light source enables illumination from below, which may be advantageous with a light shielding arrangement which is lowered from the top of the window. The light source can then more easily direct light into the space 5 also when the light shielding arrangement is almost closed (pulled down).

A detector 9 is arranged to detect the current position of the light shielding arrangement. The detector may be a simple contact detector, a photo detector, or any other type of detector suitable to determine the current position of the light shielding arrangement. In the case of a curtain which is movable sideways or from top to bottom in a window, as shown in FIG. 4, the detector 9 can simply detect the extension of the curtain. In the case of a venetian blind with horizontal slats, as in FIG. 1, the detector 9 can be arranged to detect how far down the slats have been lowered, as well as the inclination of the slats. As all slats are typically inclined by the same angle, one sensor may be sufficient. However, multiple sensors are also possible.

A controller 8 is connected to the detector and to the light source, and programmed to control the light emission from the light source in response to the current position of the light shielding arrangement. The control of the light source may include, but is not limited to, intensity, direction and beam angle. The control may be performed based on predetermined settings. For example, the controller may be programmed to control the light source 6 to provide a predetermined illumination for a given position of the light shielding arrangement 2. This predetermined illumination may be adjusted to resemble the exterior light entering the space 5 with this position of the light shielding arrangement, so as to give an impression of strong exterior light, even when exterior light is weak or non-existing.

The controller 8 may further be connected to a light sensor 7 which is arranged to detect current exterior lighting conditions, such as luminance and color temperature. In the case of a window facing the outside, the sensor will detect daylight. From the detected parameters from sensor 7, the controller 8 controls the light source 6 to emit light which is adjusted based on the current exterior lighting conditions. For example, if the detected luminance level is below a preset threshold value, for example due to that it is a cloudy day, the light source 6 can be switched on to emit light that compensates for the low luminance level, whereby light having a desired luminance level is all the time entering the room 5 through the slats 3 of the sunscreen 2. If the detected color temperature is a relatively cold white the light source 6 can be controlled to emit a warmer white light.

By controlling the light source in response to the exterior lighting conditions a dynamic illumination may be achieved. As the artificial light enters the space through the slats, the artificial light may be perceived as daylight, for example in that natural shadows and reflections are formed in the space. For example, the characteristic stripes of shadows formed by the slats are present also when artificial light enters the space through the window or opening.

The controller 8 can further be arranged to control the light shielding arrangement 2 in response to the detected exterior lighting conditions. For example, the slats 3 can be controlled to change position and orientation depending on if exterior lighting or the light source 6 is the dominant source of light in the room 5. In other words, the slats 3 may be oriented in a way that is optimal for the current lighting conditions, and the slats 3 may for example be angled to reflect the light toward the ceiling or floor to avoid glare, which may be inconvenient for someone who is in the room 5.

Figure 2A:
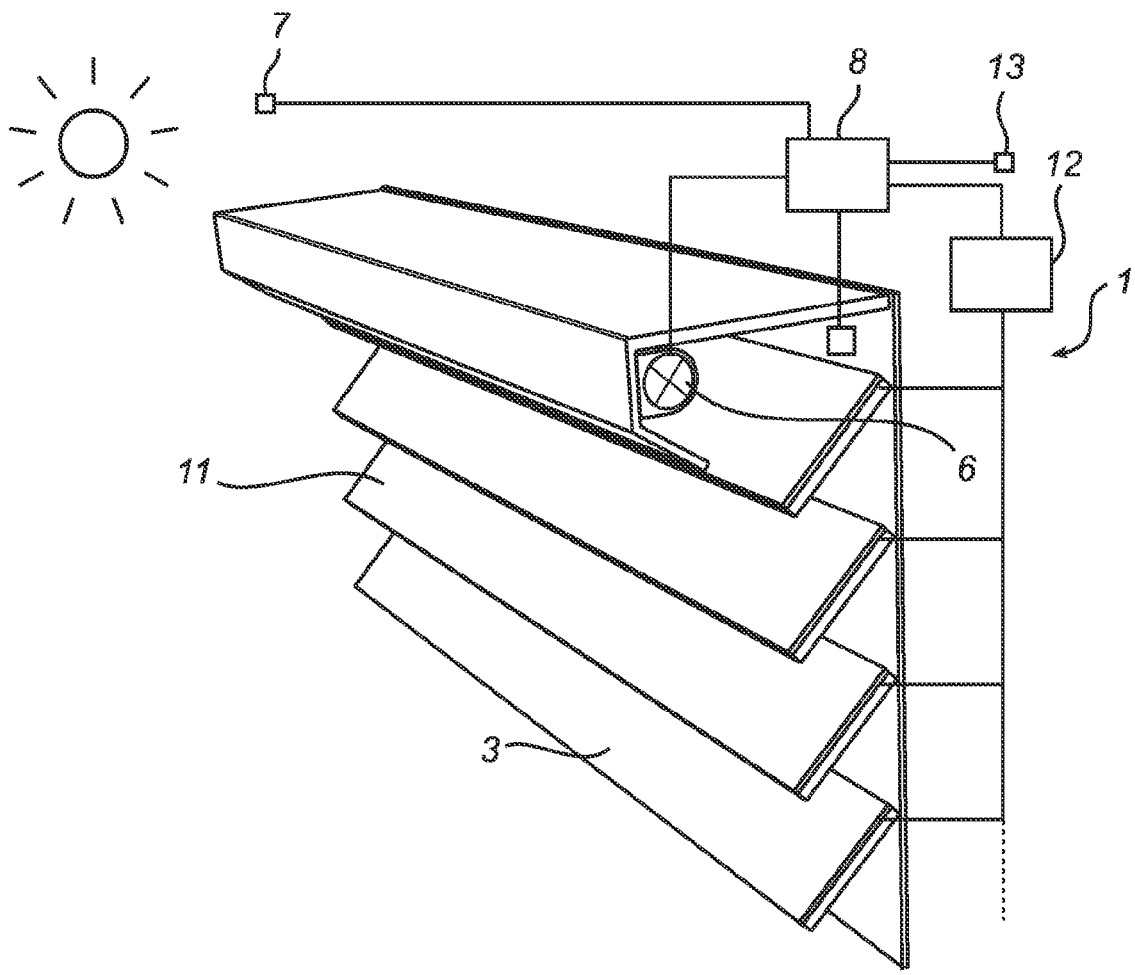
FIG. 2a-b schematically shows a window provided with a system of the present invention which is further provided with solar cells.
Figure 2B:
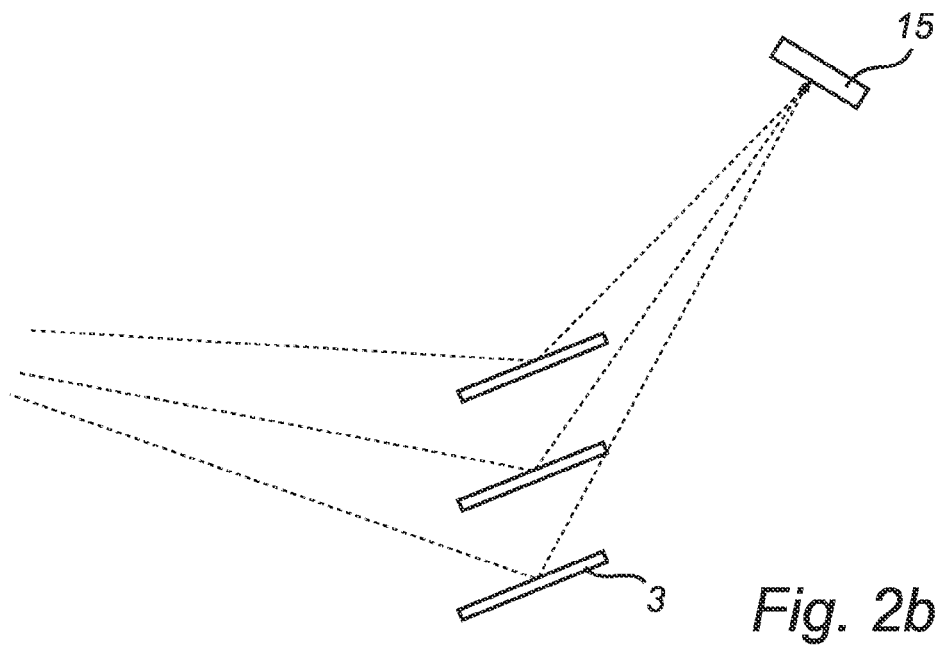

In FIG. 2a-b a similar system as in FIG. 1 is depicted, but the system is further provided with solar cells. In FIG. 2a a plurality of solar cells 11 are arranged on the slats 3, so that the slats 3 can be oriented so as to direct the solar cells 11 toward the sun. Thereby the solar energy may be collected when the sunlight impinge on the solar cells 11. The system can hence be driven by means of solar energy converted into electricity. Here, batteries 12 are used to store the energy.

Further, a presence detector 13 is arranged inside the room 5 to detect if a person is present in the room 5. If there is no-one present, the slats 3 can be used exclusively for sun tracking, directing the slats 3 in an optimal direction toward the sun. Or, the slats 3 are simply closed to direct the solar cells 11 outward. Yet another possibility is that certain angles of the slats 3 result in that the upside of a slat reflect light toward the underside of the slat above which is provided with sun cells, or vice versa. Moreover, also during combined daylight and artificial lighting control of the system at least some of the solar cells 11 may still be directed to collect solar energy depending on the orientation of the slats 3.

In FIG. 2b a single solar cell 15 is arranged on the inside of and above the window. Here, the slats may be oriented in a way that sunlight impinge on the solar cells and is further reflected toward the solar cell 15. The optimal orientation of the slats for directing the light toward the solar cell can be kept constant if a presence detector 13 is used and has detected that there is no one present in the room. In the illustrated example, the optimal orientation of the slats for reflecting sunlight toward the solar cell 15 still allows light to enter the room. Moreover, several different orientations of the slats 3 result in that at least some sunlight is reflected toward the solar cell 15.

In FIG. 3 differently arranged systems according to various embodiments of the present invention are schematically illustrated wherein the light source 6 is on and emits light toward the light shielding arrangement 2. Each of the systems illustrated in FIG. 3a-e depicts a single light source 6, although there may be a plurality of light sources arranged in place of the single light source, or on different locations for combined effects.

Figure 3A:
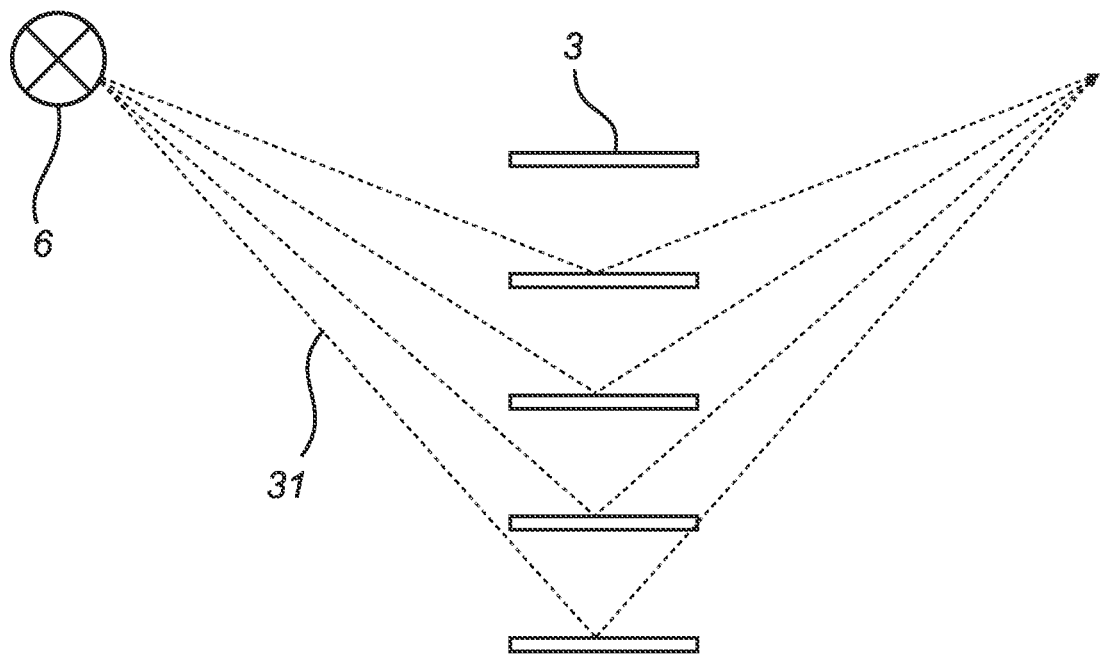
FIG. 3a-e are schematic illustrations of differently arranged systems according to different embodiments of the present invention.
Figure 3B:
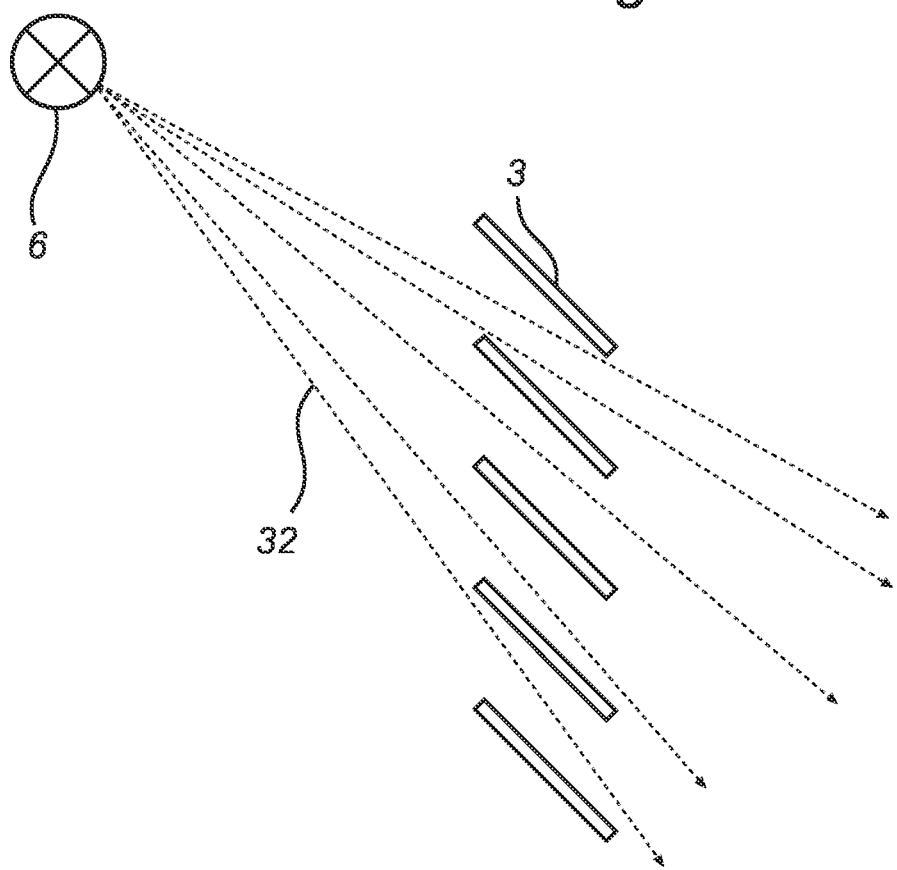
Figure 3C:
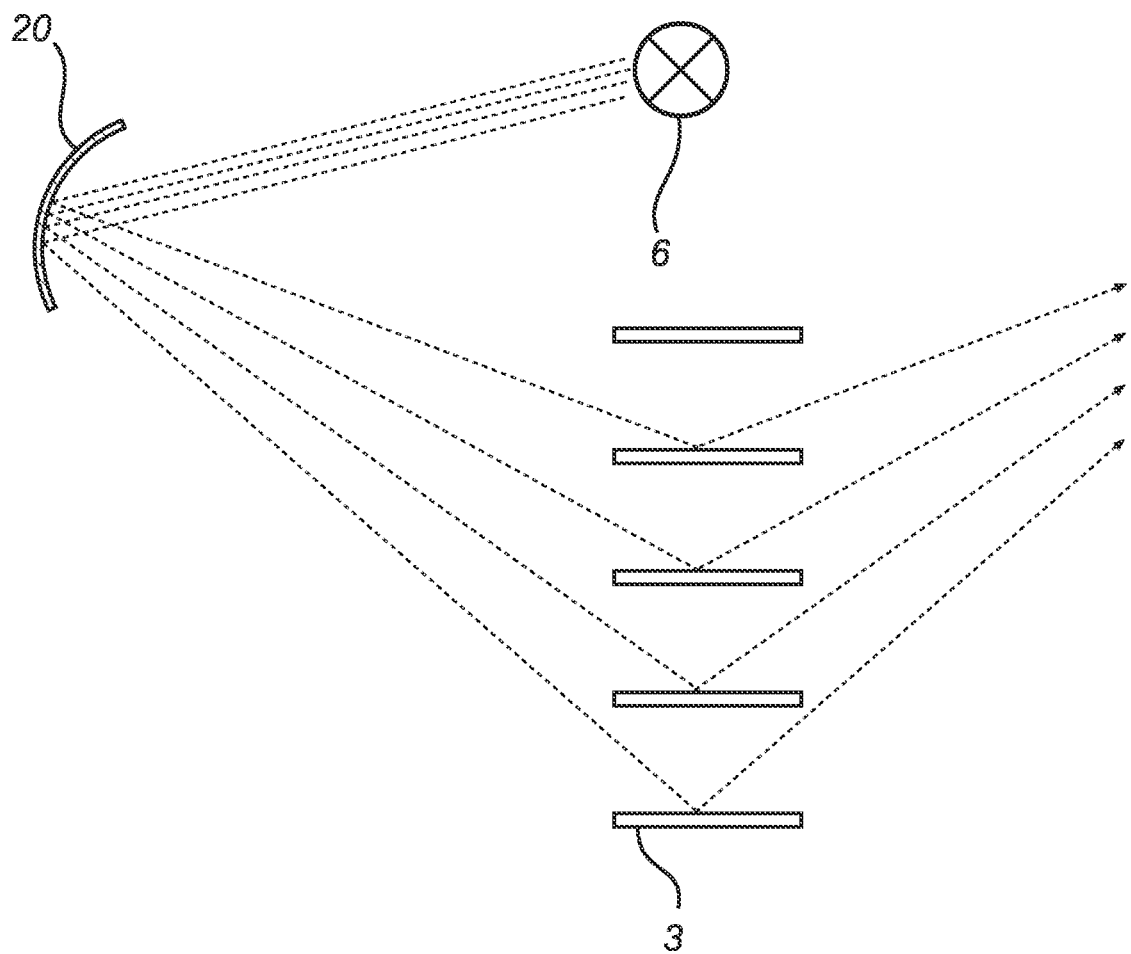
Figure 3D:
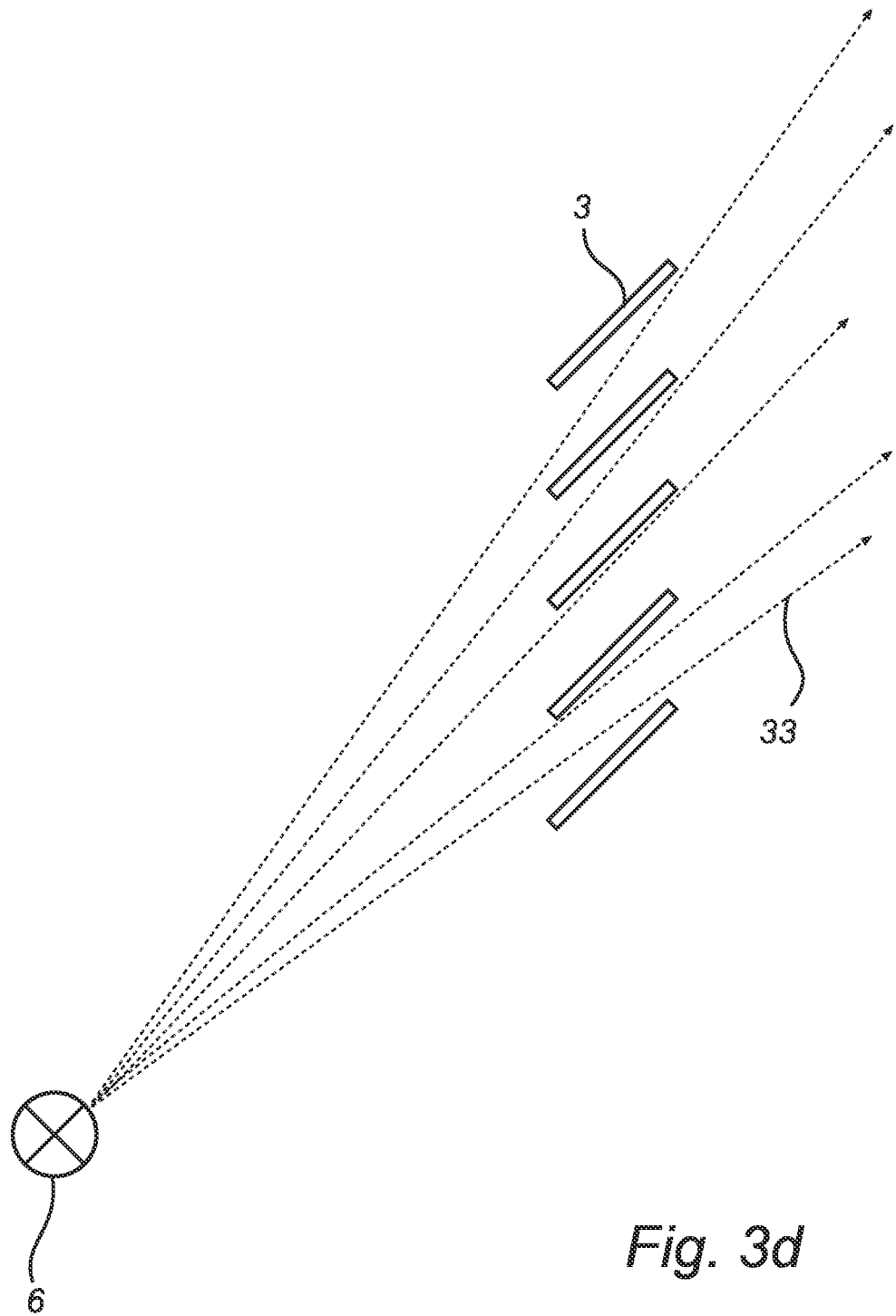
Figure 3E:
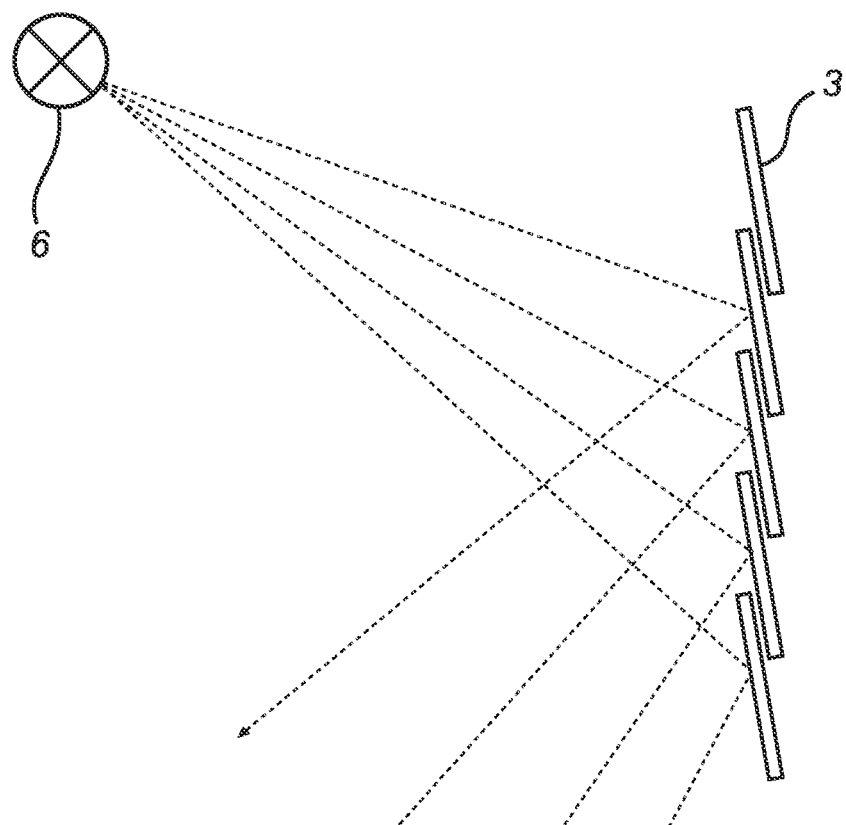

In FIG. 3a-b, as well as in FIG. 3d-e, the light source 6 is arranged outside the window for directing light toward the exterior side of the window in which the slats 3 are arranged.

In FIG. 3a the slats 3 are horizontally oriented in such a way that the light beams 31 are reflected on the slats 3 toward the ceiling of the room, to indirectly illuminate the room.

In FIG. 3b the slats 3 are diagonally oriented so as to only reflect a part of the light, and part of the light can enter the room directly without reflection on the slats 3, which direct light 32 is depicted in FIG. 3b. Here, a relatively sunny scene is achieved in the room.

In FIG. 3c the light source 6 is arranged above the slats inside the window, and emits light toward a light redirecting arrangement 20 outside the window. The light redirection arrangement is here illustrated as a reflector 20, which directs the light toward the slats 3 for reflection into the room.

In FIG. 3d the light source 6 is arranged outside but below the window to emit light upwardly toward the slats 3. In the illustrated example, the slats 3 are diagonally oriented upwardly toward the ceiling, so that parts of the light 33 is entering the ceiling of the room directly without reflection on the slats 3.

In FIG. 3e the slats are closed whereby the light that impinges on the slats 3 is reflected back toward the outside. This feature, that is an additional feature that can be achieved by the system of the present invention, can be used to form a decorative lighting on the outside of a window, for effective illumination especially when it is dark outside. The decorative lighting may be further enhanced by adding alternating beam angles, and/or different colors to the illumination. For example, different windows of a building may be illuminated with different colors or with alternating beam angle and/or colors to form a decorative lighting full of variety.

Even though the invention has been described with reference to specific exemplifying embodiments thereof, many different alterations, modifications and the like will become apparent for those skilled in the art. For example, the light shielding system may be of a different type, such as a set of vertical blinds, or a different type of curtain. The light shielding system may be manually controlled, and for example be manually pulled up to allow light in through a window. The light sources may be controlled in different ways according to for example day- or seasonal variations. The light shielding arrangement may be arranged in any opening where it can shield exterior light from a space, such as in relation to a patio, or in an opening dividing two indoor spaces. The controller may be programmed via a user interface.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

The invention claimed is:

1. A system for combining light from exterior lighting with light from artificial lighting, comprising:
   a light shielding arrangement for shielding exterior light from a space, said light shielding arrangement having an interior side toward the inside of said space, and an exterior side toward the outside of said space;
   at least one light source arranged to emit artificial light that is directed toward the exterior side of said light shielding arrangement,
said light source being controllable in response to current exterior lighting conditions, and
   a controller connected to said light source, and arranged to control light emission of said light source in response to a current position of said light shielding arrangement, so as to emulate an effect of exterior light escaping through said light shielding arrangement.

2. The system according to claim 1, further comprising a detector for detecting a current position of said light shielding arrangement, said detector being connected to said controller and adapted to provide information regarding said current position to said controller.

3. The system according to claim 1, further comprising a light sensor for detecting said current exterior lighting conditions said sensor being connected to said controller and adapted to provide information regarding said exterior lighting conditions to said controller.

4. The system according to claim 3, wherein said light sensor is configured to detect at least one of a luminance level and a color temperature.

5. The system according to claim 3, wherein said at least one light source is arranged on the outside of said space.

6. The system according to claim 3, wherein said at least one light source is arranged on the inside of said space, the system further comprising means for directing the light toward the exterior side of said light shielding arrangement.

7. The system according to claim 3, wherein said at least one light source is adapted to emit directional light.

8. The system according to claim 3, wherein said light source is a solid state light source.

9. The system according to claim 3, wherein said controller is configured to control a position and orientation of said plurality of slats in response to the current exterior lighting conditions.

10. The system according to claim 3, wherein said light shielding arrangement comprises a plurality of controllable slats, which are positionable to allow exterior light to enter between said slats.

11. The system according to claim 10, further comprising at least one solar cell arranged on one of said slats.

12. The system according to claim 10, further comprising a solar cell arranged at a distance from said slats, said solar cell being arranged in a position allowing daylight to be reflected by said slats toward said solar cell.

13. The system according to claim 11, further comprising a presence detector for detecting presence of a person in said space, said controller being configured to control said slats to perform sun tracking as long as no presence is detected.

* * * * *